Sept. 1, 1953 N. S. HULSTEIN 2,650,788
DEVICE FOR ADJUSTABLY SUPPORTING CAMERAS OR THE LIKE
Filed Dec. 1, 1945
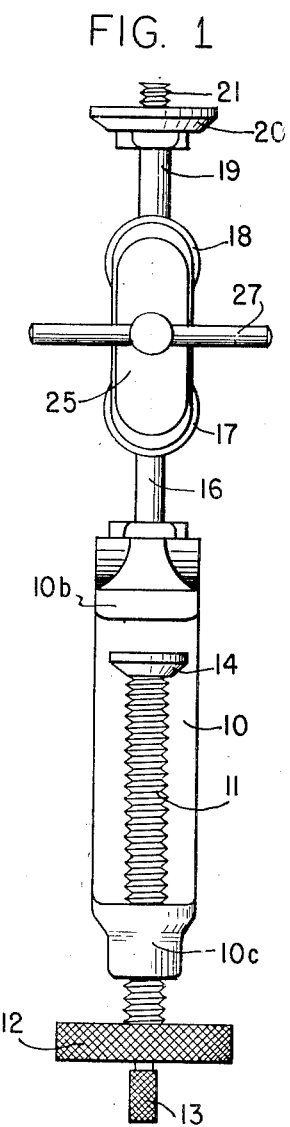
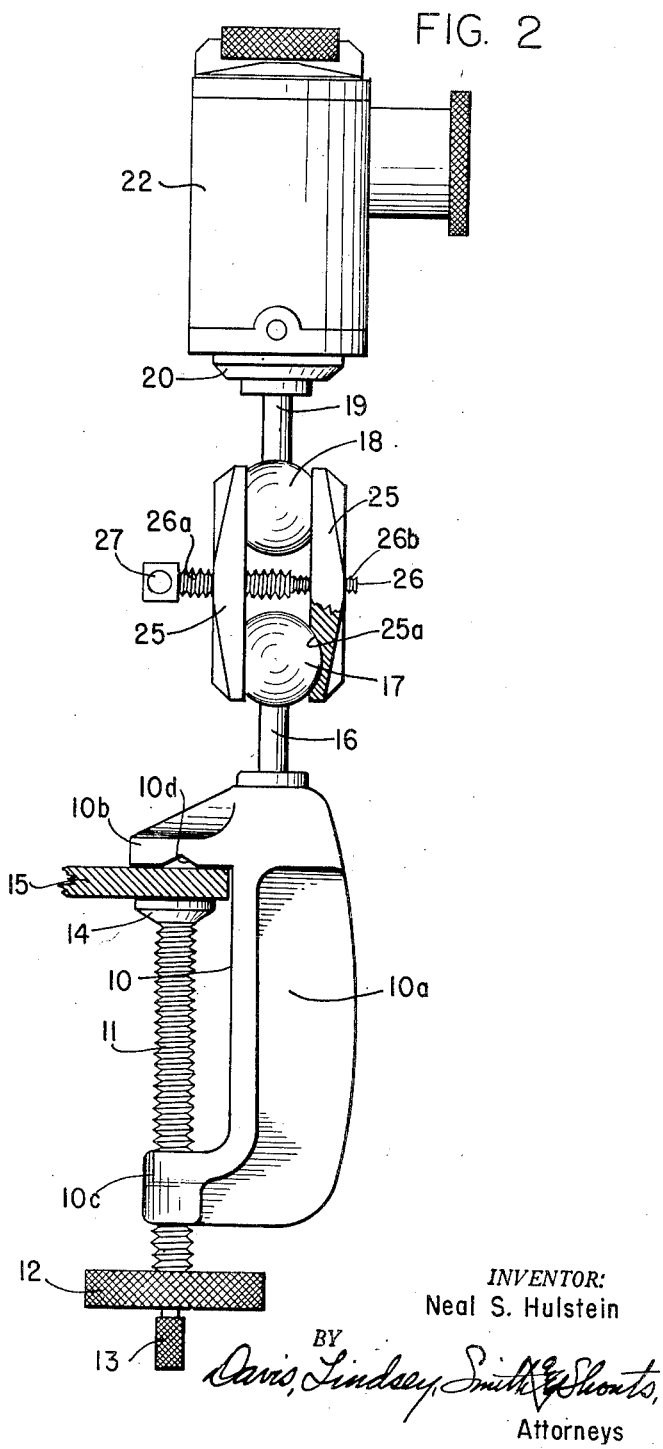
INVENTOR:
Neal S. Hulstein
Attorneys Patented Sept. 1, 1953

2,650,788

UNITED STATES PATENT OFFICE 2,650,788

DEVICE FOR ADJUSTABLY SUPPORTING CAMERAS OR THE LIKE

Neal S. Hulstein, Denver, Colo., assignor to Heiland Research Corporation, Denver, Colo., a corporation of Colorado Application December 1, 1945, Serial No. 632,187

1 Claim. (Cl. 248—229)

This invention relates to improvements in adjustable supporting devices adapted to be clamped on a table or other member and to be used for adjustably supporting cameras, flashlight bulbs and other objects in a variety of positions.

The principal object of the invention is to provide an improved device which may be conveniently carried about by cameramen and others and which may be readily employed for supporting a camera or other object in any desired position. A further object of the invention is to provide a supporting device adapted to be readily mounted in position and capable of adjustment by the manipulation of a single operating member to hold a camera or other object in a large number of different positions. Other objects relate to various features of construction and arrangement which will appear more fully hereinafter.

The nature of the invention will be understood from the following specification taken with the accompanying drawings in which one embodiment is illustrated. In the drawings, Figure 1 shows an edge elevation of the improved supporting device; and Fig. 2 shows a side elevation of the device shown in Fig. 1 with a camera mounted thereon and with a part thereof broken away.

As illustrated in the drawings the invention comprises a supporting yoke 10 made up of an upright body portion 10a, an upper transversely extending flange 10b, and a lower flange 10c which extends parallel to the flange 10b. The lower flange 10c is apertured for threaded engagement by an adjusting member 11 which has secured to the lower end thereof, below the clamp, a knurled wheel 13 adapted to be engaged by the fingers of the operator for effecting relatively large and rapid adjustments of the member 11, and also with a knurled member 12 of relatively large diameter which may be engaged by the fingers for exerting greater force in turning of the member 11. The adjusting member 11 is provided at its upper end with a rotatably mounted circular plate or collar 14 adapted to cooperate with the flange 10b in gripping the edge portion 15 of a table or other support. This supporting member 15 may be of varying thickness and configuration due to the range of adjustment of the member 11 and the flange 10b is preferably provided with a notch 10d which will permit the placing of the clamp on a support of circular or other irregular contour.

The body portion 10a of the clamp has secured in the upper end thereof an upwardly extending rod 16 having secured on the extremity thereof a spherical ball 17. Another spherical ball 18 is secured on the lower end of another rod 19 which carries at its upper end a circular plate 20 having a threaded stud 21 projecting therefrom in axial alignment with the rod 19. The stud 21 is adapted to engage a threaded recess in the base plate of a camera 22 or other object which is to be carried by the supporting device. For the purpose of permitting relative adjustment of the two rods 16 and 19 and a corresponding variation of the position of the camera 22, the spherical balls 17 and 18 are connected together by two clamping plates 25, each of which is provided at its opposite ends with recesses 25a each formed as a segment of a spherical surface of the same radius as balls 17 and 18. The opposite sides of each ball are engaged by the recesses in the two oppositely disposed members 25 and these members 25 are secured together by a clamping screw 26 having a transversely extending handle 27 which may be manipulated by the operator for the purpose of drawing the plates 25 together and thereby gripping the balls 17 and 18 between them or releasing the balls so that a relative adjustment of the rods 16 and 19 may be effected. In order that this relative movement of the two plates 25 may be effected by the single operating member 26, this member is made up of a portion 26a of larger diameter having a comparatively small number of threads per inch, and a part 26b of smaller diameter having a greater number of threads per inch so that the rotation of the member 26 by the operation of the handle 27 will cause the two clamping plates 25 to move toward or away from each other. It has been found in practice that a satisfactory operation is obtained when the larger portion 26a is provided with twenty-four threads per inch and the smaller portion 26b is formed with thirty-two threads per inch. Thus one complete revolution of the member 26 effects a differential movement of the mid-portions of the two plates 25 of 0.0104" resulting from the difference between the two movements of the respective plates 25 of 0.0417" and 0.0313".

From the foregoing description it will be apparent that a supporting device has been provided which may be employed to support a camera, flashlight bulb, or other objects in a great number of different positions. The clamping yoke 10 may be secured upon a support 15 which may be either horizontal or vertical or located at an angle to the horizontal and the adjustable clamping device located between the yoke and the supporting plate 20 is such that a great number of relative angular positions of the rods 16 and 19 may be obtained, since both of the clamping plates 25 are capable of rotation in any direction on the spherical ball 17 and the ball 18 is capable of rotation in any direction with respect to the plates 25. In a plane parallel to the surfaces of the plates 25 in which the recesses 25a are formed, the degree of relative angular adjustment of the rods 16 and 19 is substantially unlimited, while in a transverse direction the relative adjustment is limited only by the engagement of the rods 16 and 19 with the edges of the clamping plates.

Although one form of the invention has been shown and described by way of illustration, it will be understood that it may be constructed in various other embodiments which come within the scope of the appended claim.

I claim:

A device for adjustably supporting a camera or the like, said device comprising a clamp adapted to grip the edge of a support, a first ball member rigidly attached to and projecting from said clamp, a second ball member having means for releasably attaching it to the camera or the like to be supported, a pair of clamping plates provided with depressions of substantially semispherical form near their opposite ends for clamping engagement with opposite sides of said ball members, and a single adjusting screw passing through threaded apertures in said clamping plates at their mid-portions and between said ball members, said adjusting screw having threads of a first relatively fine pitch of about $\frac{1}{24}''$ engaging in the threaded aperture of one of said clamping plates and threads of a second relatively fine pitch of about $\frac{1}{32}''$ engaging in the threaded aperture of the other of said clamping plates, whereby turning of said adjusting screw will cause said clamping plates minutely to move toward or away from each other in order to effect a corresponding differentially fine adjustment of the clamping pressure on said ball members.

NEAL S. HULSTEIN.

References Cited in the file of this patent

UNITED STATES PATENTS

| Number | Name | Date |
| --- | --- | --- |
| 787,486 | Whipple | Apr. 18, 1905 |
| 980,647 | Latham et al. | Jan. 3, 1911 |
| 1,170,422 | Denman | Feb. 1, 1916 |
| 1,300,863 | Otte | Apr. 15, 1919 |
| 1,455,441 | Hodny | May 15, 1923 |
| 1,516,795 | Schwarting | Nov. 25, 1924 |
| 1,543,037 | Teeter | June 23, 1925 |
| 2,087,812 | Peluse | July 20, 1937 |
| 2,440,873 | Popp et al. | May 4, 1948 |

FOREIGN PATENTS

| Number | Country | Date |
| --- | --- | --- |
| 172,775 | Great Britain | Dec. 22, 1921 |
| 397,167 | Germany | June 14, 1924 |
| 612,722 | Germany | May 3, 1935 |